UNITED STATES PATENT OFFICE.

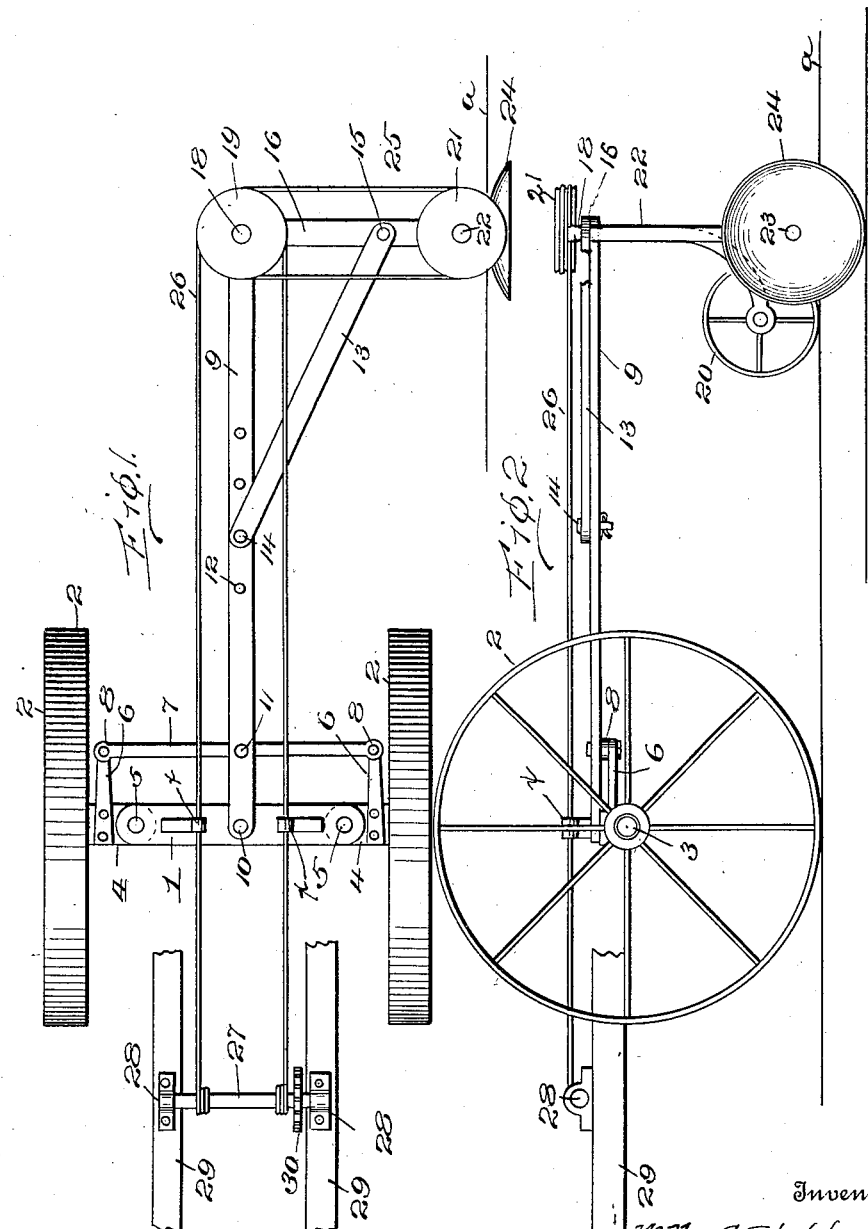

WALTER C. STEPHENS, OF APLIN, NORTH DAKOTA.

AUTOMATIC GUIDING DEVICE.

1,005,351. Specification of Letters Patent. Patented Oct. 10, 1911.

Application filed May 28, 1910. Serial No. 563,976.

*To all whom it may concern:*

Be it known that I, WALTER C. STEPHENS, a citizen of the United States, residing at Aplin, in the county of Oliver and State of North Dakota, have invented certain new and useful Improvements in Automatic Guiding Devices, of which the following is a specification.

This invention relates to automatic guiding devices for traction engines designed to be used with gang plows or other power agricultural implements, and one of the principal objects of the same is to provide means of simple construction which will automatically guide the implement to form furrows of equal distances apart.

Still another object of the invention is to provide an automatic steering device for agricultural implements which will hold the implement at the required distance from the furrow last formed and which will prevent the implement from running off toward the land-side or toward the unplowed ground.

These and other objects may be attained by means of the construction illustrated in the accompanying drawing, in which, Figure 1 is a top plan view of an automatic steering mechanism made in accordance with my invention. Fig. 2 is a side elevation of the same, the diagonal brace being shown broken away.

Referring to the drawing the numeral 1 designates an axle and 2 are ground wheels mounted to rotate on spindles 3 projecting outward from the short stub shafts 4, which are pivoted at 5 to the axle 1. Rigidly connected to the stub shafts 4 are brackets 6 which extend forwardly and are connected to a cross bar 7 by pivot pins 8. A guide bar 9 is pivoted at 10 to the axle and at 11 to the cross bar 7. The guide bar 9 is provided with a series of perforations 12 and a diagonal brace 13 is pivotally connected at 14 in one of the perforations 12. The opposite end of the brace 13 is pivoted at 15 to a bar 16. The guide bar 9 and the bar 16 are connected by means of an axle or pin 18 on which is mounted a double grooved pulley 19. On the lower end of the axle or pulley 18 a pilot wheel 20 is journaled. On the outer end of the bar 16 a grooved pulley 21 is journaled upon the upper end of a vertical bar 22. Journaled upon a laterally projecting spindle 23 at the lower end of the bar 22 is a concavo convex disk 24 designed to run in the furrow on the line a. A cable 25 extends around the grooved pulley 21 and around one of the double pulleys 19. A cable 26 extends around one of the double pulleys 19 and is led backward through eyes $x$ to an axle 27 journaled in keepers 28 on a frame 29 of the implement. A ratchet wheel 30 is carried by the shaft 27. The cables 25 and 26 are for the purpose of keeping the disk 24 in such a position as to continually run against the land side of the furrow while plowing, and the disk 24 is set and held in position by the cables 25 and 26.

The operation of my invention may be briefly described as follows: The disk 24 bears against the land-side of the furrow $a$ previously made by the machine and has a tendency to hold the machine directly in parallel line with the previously formed furrow. When the disk 24 is moved transversely in either direction it moves the wheels 2 so that the direction taken by the machine will always remain constant in parallelism with the line $a$.

My invention is simple in construction, can be applied to any character of agricultural implements and will automatically guide the same in its operations across the field.

Having thus fully described the invention what is claimed as new is:

1. A guiding device for agricultural implements comprising an axle, wheels mounted upon stub shafts pivoted to said axle, brackets extending forward from said stub shafts, a cross bar pivoted to said brackets, a guide bar pivoted to the axle and to said cross bar, a diagonal brace, a laterally extending bar, said brace being adjustably connected to said guide bar and pivoted to said laterally extending bar, a concavo convex disk journaled to a bar connected to the outer end of the laterally extending bar, grooved pulleys, cables passing around said pulleys, one of said cables extending backward to an axle journaled on the frame.

2. A guiding device for agricultural implements comprising an axle, wheels mounted on stub shafts pivoted to said axle, a guide bar pivoted to said axle, a laterally extending bar pivoted to said guide bar, a brace adjustably connected to said guide bar and pivoted to said laterally extending bar, a concavo convex disk for running in the furrow, a pilot wheel for supporting the guide bar, pulleys at the opposite ends of the laterally extending bar, cables passing around said pulleys, one of said cables extending backward and around an axle on the frame.

In testimony whereof I affix my signature in presence of two witnesses.

WALTER C. STEPHENS.

Witnesses:
   CHAS. WAECHTER,
   H. L. STEPHENS.

Copies of this patent may be obtained for five cents each, by addressing the "Commissioner of Patents, Washington, D. C."